A. P. ROUTT.
Cultivator.
No. 80,015.  Patented July 14, 1868.
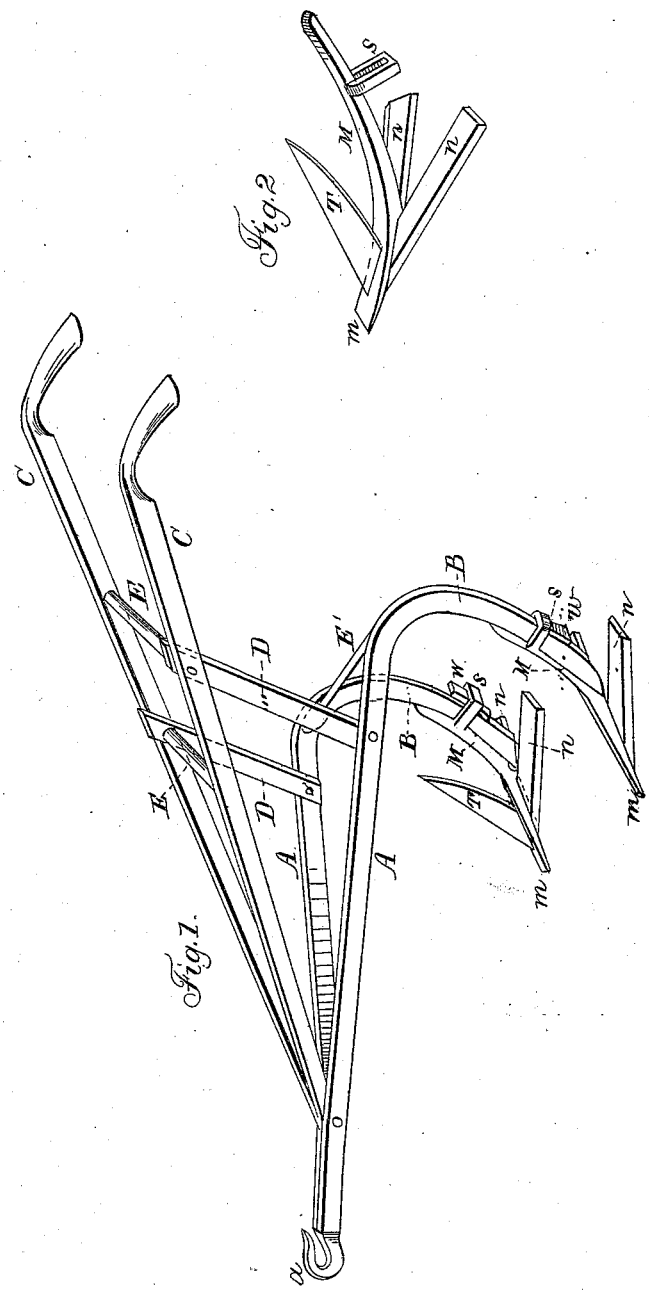
WITNESSES:
INVENTOR:

United States Patent Office.

A. P. ROUTT, OF LIBERTY MILLS, VIRGINIA.

Letters Patent No. 80,015, dated July 14, 1868.

IMPROVEMENT IN CULTIVATOR.

*The Schedule referred to in these Letters Patent and making part of the same.*

TO ALL WHOM IT MAY CONCERN:

Be it known that I, A. P. ROUTT, of Liberty Mills, in the county of Orange, and State of Virginia, have invented a new and useful Improvement in Cultivators; and I do hereby declare that the following is a full, clear, and exact description of the construction and operation of the same, reference being had to the accompanying drawings, making a part of this specification, in which—

Figure 1 is a perspective view of a plow or cultivator with my improvement attached.

Figure 2 is a detached perspective view of the device which I attach to cultivators.

This invention is an improvement upon the one patented by me, April 30, 1867, and consists in an instrument which I attach to the standards that support the plows, and employ for the purpose of cutting and destroying the weeds and grass between rows of standing corn and other growing vegetables.

In the drawings, A A' represent the plow-beams, united at their forward end at the eye or hook a, and bent downward at their rear ends, so as to form the plow-standards B B, one a little in advance of the other.

C C are the handles; D D, standards that support them; and E E', braces, rounds, or cross-bars, that connect and strengthen the frame of the instrument.

As thus far described, the instrument is substantially the same as that patented by me, April 30, 1867, referred to above.

My present improvement consists in attaching to the lower ends of the standards B B, in place of the plows, and by means of loops or sockets, s s, and a wedge or key, w, or wood, iron, or other suitable material, a device, the form and construction of which are clearly shown in fig. 2, as unconnected with the instrument, and in fig. 1, as attached thereto and ready for use.

In the drawings, M represents a standard, which is fixed to the plow-standard by the loop s and key w, as above explained. At its lower end it bends forward, terminating in a sharp cutting-point, m. From a point immediately behind the cutting-point, a sharp-edged cutting-blade, n, extends outward and backward on either side of the standard, in a nearly horizontal position, its cutting-edge being on the front side. The object of these lateral blades being to sever weeds, grass, &c., between the hills of corn, their front edge is made very sharp, and is composed of well-tempered steel. A coulter, T, may be provided, if necessary, being attached to the standard just behind the point m, as seen in fig. 2.

The plows may at any time be removed from the instrument, and the device shown in fig. 2 inserted in their place. The cultivator will then be ready for use, and will operate very effectively and conveniently.

It is evident that by this means a farmer having one of my improved plows, as covered by my patent of April 30, 1867, may provide himself with a convenient instrument for cultivating and cleaning the land from weeds, &c., at the merest trifle of expense, it only being necessary for him to obtain two of the improved cultivator-points, as shown in fig. 2, and attach them to the standards B B in place of the plowshares.

Having thus described my invention, what I claim as new, and desire to secure by Letters Patent, is—

1. The instrument, consisting essentially of the standard M, loop s, point m, and blades n n, having sharp front cutting-edges, when the several parts thereof are constructed and arranged as above described, and for the purpose set forth.

2. The combination of said instrument with the plow-standards B B and wedge W, substantially as described.

A. P. ROUTT.

Witnesses:
WM. G. WILLIAMS,
E. W. ROW.